March 26, 1946.  N. H. CLOUGH  2,397,337
PROTECTING ARRANGEMENT FOR THERMIONIC VALVE CIRCUITS
Filed Feb. 7, 1944
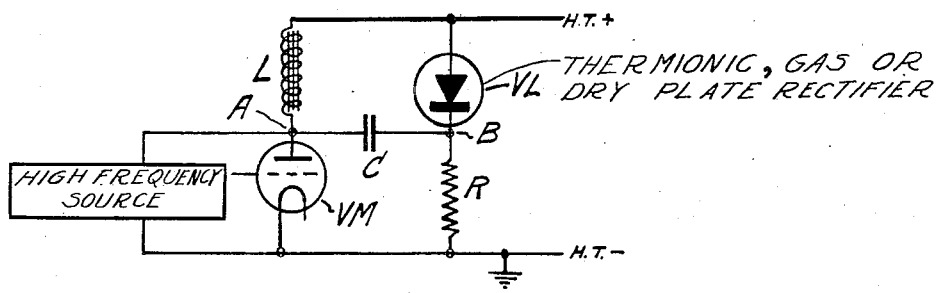
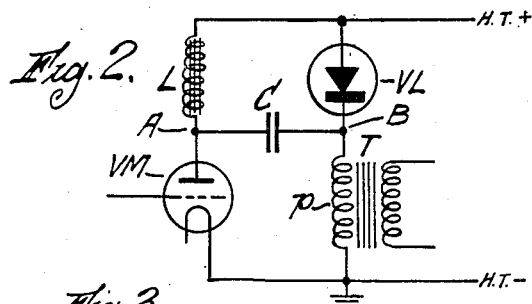
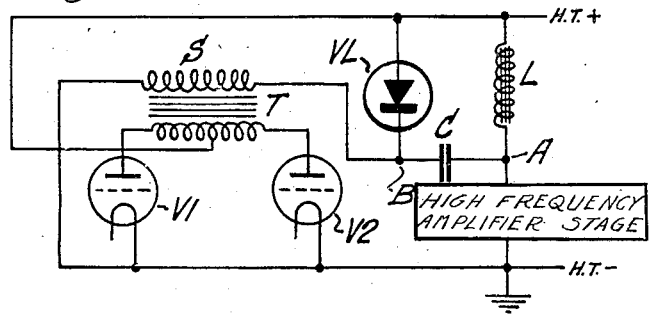
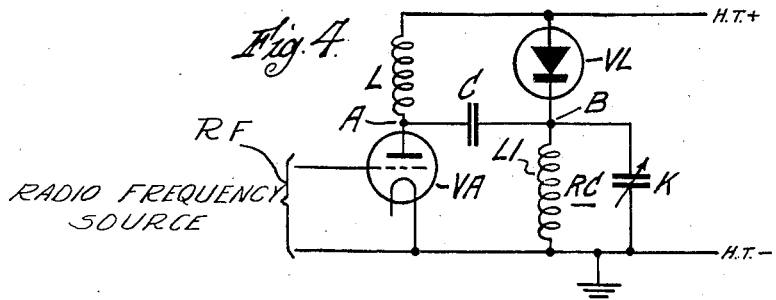
INVENTOR.
Newsome Henry Clough
BY
ATTORNEY Patented Mar. 26, 1946

2,397,337

UNITED STATES PATENT OFFICE 2,397,337

PROTECTING ARRANGEMENT FOR THERMIONIC VALVE CIRCUITS

Newsome Henry Clough, Brentwood, England, assignor to Radio Corporation of America, a corporation of Delaware Application February 7, 1944, Serial No. 521,384
In Great Britain September 10, 1942

12 Claims. (Cl. 250—27)

This invention relates to protecting arrangements for thermionic valve or vacuum circuits.

In thermionic valve circuits, it frequently happens that undesired high voltages are produced which may have destructive effects upon the insulation of circuit elements. These high voltages may be produced, for example, by the switching of inductive circuits or by the over-driving of resonant circuits. Thus, for example, in an audio frequency modulation circuit, wherein a choke is included in the anode circuit of a modulation valve, to the control grid of which modulation voltages are applied, it may happen, that as the result of some switching operation at a preceding stage a high negative bias is applied to the grid of the modulation valve. This negative bias may cause a positive transient voltage in the anode circuit of such a value as to break down the insulation to earth, of the choke.

Attempts heretofore made to overcome difficulties from this cause, include the use of limiters on earlier stages, or the use of spark gaps across the inductive element itself, in the case under consideration across the choke. Of these, the first requires constancy of subsequent amplification, and will not, in any case, deal adequately with a sharp wave front, and the second is incapable of an adjustment which, while sufficiently critical, can be maintained under all conditions of climate and operation.

Solution of the problem is complicated by the fact that in modulation circuits, speech transients up to the equivalent of 100% modulation must be reproduced. Thus the suppression of all positive transients is not permissible.

According to the invention, in a protecting arrangement for a thermionic valve circuit, there is included across the series-connected anode/cathode space of a valve and an inductive element, a series-connected impedance and rectifier, the junction point of the anode of the valve whose cathode is connected to the negative terminal of the usually provided source of anode current with the inductive element being capacity coupled to the junction point of the impedance with the anode of the rectifier whose cathode is connected to the positive terminal of said usually provided source of anode current. In this arrangement, the occurrence of a transient voltage at the anode of the valve, such as to raise the potential thereof to more than twice the voltage of the positive terminal of the source, raises the potential at the anode of the rectifier above the voltage of said positive terminal so that currents due to the high potential transient will pass through the rectifier.

Four circuit arrangements in accordance with the invention will be described.

Referring to the accompanying drawing:

Fig. 1 is a first circuit arrangement of the invention,

Fig. 2 is a second circuit arrangement of the invention,

Fig. 3 is a third circuit arrangement of the invention, and

Fig. 4 is a fourth circuit arrangement of the invention.

Referring now to Fig. 1, a modulation valve VM, which may be a triode, is connected in series with an iron-cored choke L, the inductive element to be protected, between the positive and negative terminals of a source of anode current not shown but indicated by the usual conventional signs of polarity, and has applied across its anode/cathode space radio frequency energy from any suitable high frequency source. Across its grid/cathode space, modulation voltages are applied. As is usual, the position of the choke is between the positive terminal HT and of the source of anode current and the anode of the modulation valve. Also connected between the positive and negative terminals of the source of anode current are connected, in series, a diode rectifier, VL, and a resistance R, the cathode of the rectifier being connected to the positive terminal HT+, and the resistance being connected between the anode of the rectifier and the (earthed) negative terminal HT—. The anode of the valve and the anode of the rectifier are coupled together by a condenser C, which is connected between points A and B.

During normal operation of this circuit arrangement, the anode of the diode VL is at negative potential and the condenser is charged, through the choke L and resistance R in series relationship, to the potential of the source of anode current. The potential across the rectifier is substantially that of the source of anode current, with the cathode positive and anode negative so that the rectifier is non-conductive.

If, however, from any cause, a transient positive potential is produced at the anode of the valve VM, which is such as to raise the potential of the anode by more than that due to the charge on the condenser above the potential of the positive terminal of the source, the voltage across the rectifier is reversed and the rectifier becomes conductive. Further progress of the transient voltage will be reduced—provided the rectifier VL has a sufficiently low resistance—to the rate at which the condenser C will change its voltage while absorbing the transient current. This rate and also the amplitude of the peak of the transient voltage may be reduced by increasing the size of this condenser.

The second circuit arrangement to be described is illustrated in Fig. 2 of the accompanying drawing, and is essentially the same as that already described except that, being applied to a shunt-fed transformer coupled stage, for example a low frequency power output stage, the resistance R is replaced by the primary winding $p$ of the coupling transformer T.

The third circuit arrangement to which the protective arrangement of the invention will be described as being applied is illustrated in Fig. 3 of the accompanying drawing, and is a class B transformer-coupled modulated amplifier. In this circuit arrangement, a high frequency amplifier stage, is connected in series with a choke L, the inductive element to be protected, between the positive and negative terminals of a source of anode current, not shown.

The secondary winding $s$ of a transformer T is connected by a condenser C to the junction of choke L with the high-frequency stage. A diode rectifier VL, is connected in series with the said condenser C across the choke L, the cathode of the rectifier being connected to the positive terminal HT+. The primary winding of the transformer T has its two ends connected to the anodes of two class B operated valves V1 and V2, and its midpoint connected to the positive terminal HT+ of the source of anode current. The cathodes of the valves V1 and V2 are connected to the negative terminal of the source. Modulation voltages are applied to the grids of these valves. In this circuit, the resistance R is replaced by secondary winding $s$ of transformer T, and the protective arrangement operates in the same manner as that described in connection with the circuit arrangement of Fig. 1.

The fourth circuit arrangement to which the invention may be applied is illustrated in Fig. 4 of the accompanying drawing, and includes a valve VA operating as a class C amplifier, the case above referred to. In this circuit arrangement the valve VA is connected in series with a high frequency choke L, between the positive and negative terminals of a source of anode current, not shown, and has applied across its grid/cathode space radio frequency from a source, not shown, but indicated at $rf$. As is usual, the position of the choke L is between the positive terminal HT+ of the source of anode current and the anode of the amplifier valve. Also, between the positive and negative terminals of the source of anode current, are connected in series, a diode rectifier VL and a resonant circuit RC, including an inductance L1 and condenser K connected in parallel, the cathode of the rectifier being connected to the positive terminal HT+ and the resonant circuit being connected between the anode of the rectifier and the negative terminal HT—. (A condenser C is connected between points A and B, and the charging circuit for condenser C is from the positive terminal HT+, choke L, condenser C, inductance L1 to the negative terminal HT—). Protection is afforded in the manner already described.

The circuit arrangement described above in connection with Fig. 4 is not limited in operation to modulator or low frequency valves or to transients due to switching. It is applicable for example to high frequency circuits and to any case where the anode of a valve, normally driven to not more than twice the potential of the anode current source, is at some time driven further, either because of over-modulation in the case of class A and class B operation or of the removal of resonant circuit loading in class C operation.

The diode rectifier VL may be either a thermionic or gas filled valve. In certain cases, such as where low voltages are in question, a dry metal or zinc oxide rectifier may be used.

What I claim is:

1. A protecting arrangement for a thermionic valve circuit comprising a thermionic valve, a source of high frequency energy connected to the anode/cathode space of said valve and wherein there is also included across the series connected anode/cathode space of said valve an inductive element to be protected, a series-connected impedance and rectifier, the junction point of the anode of the thermionic valve whose cathode is connected to the negative terminal of the usually provided source of anode current with the inductive element being capacity coupled to the junction point of the impedance with the anode of the rectifier whose cathode is connected to the positive terminal of said usually provided source of anode current.

2. An arrangement as claimed in claim 1, wherein the said impedance is a resistance.

3. An arrangement as claimed in claim 1, wherein said valve is a modulator valve across the anode/cathode space of which radio-frequency energy is applied and across the grid/cathode space of which modulation voltages are applied.

4. An arrangement as claimed in claim 1, wherein the said impedance is an inductance.

5. An arrangement as claimed in claim 1, wherein said valve is transformer coupled to a succeeding stage, the primary winding of the coupling constituting said impedance.

6. An arrangement as claimed in claim 1, comprising a class B modulation stage transformer coupled to a high frequency stage, wherein the modulation stage includes two valves the anodes of which are connected together by means of the primary winding of a transformer the secondary winding of which is coupled to the high frequency stage by means of said condenser, said secondary winding constituting said impedance.

7. An arrangement as claimed in claim 1, wherein said valve is an amplifier valve, to the grid/cathode space of which high frequency energy is applied, the anode of said valve being coupled by means of said condenser to one end of a resonant circuit including an inductance and a condenser, said inductance constituting said impedance.

8. Circuit arrangements as claimed in claim 1 wherein said rectifier is a thermionic valve.

9. Circuit arrangements as claimed in claim 1 wherein said rectifier is a gas filled valve.

10. Circuit arrangements as claimed in claim 1 wherein said rectifier is a dry-plate metal rectifier.

11. A vacuum tube protective circuit comprising, a vacuum tube including an anode, a grid and a cathode, a rectifier having an anode and a cathode, an impedance device, a source of anode potential, an inductance, a source of high frequency energy, the anode to cathode circuit of said vacuum tube being connected to said source of high frequency energy and in series with said inductance and said source of anode potential, a connection which forms a series circuit with said impedance and said rectifier, a capacitor coupling the anode of the vacuum tube to the anode of the rectifier, and a connection between said source of anode potential and said rectifier whereby an increase in anode potential of said vacuum tube will pass through said rectifier.

12. A vacuum tube protective circuit arrangement comprising an electron discharge tube having at least an anode and a cathode connected in an alternating current circuit, a source of direct current potential having its negative terminal connected to said cathode and its positive terminal connected by a reactor to said anode, a rectifier having an anode and a cathode, leads connecting the impedance between the anode and cathode of the rectifier and an impedance in series in shunt to said source of direct current potential, the said last mentioned impedance being between the anode of the rectifier and the negative terminal of the said source of direct current potential, and a capacitor coupling the anode of the rectifier to the anode of the tube.

NEWSOME HENRY CLOUGH.